May 14, 1968      L. N. DEAN      3,383,133
TARPAULIN ROLLER FOR AIRCRAFT LUGGAGE CARRIER
Filed June 21, 1966
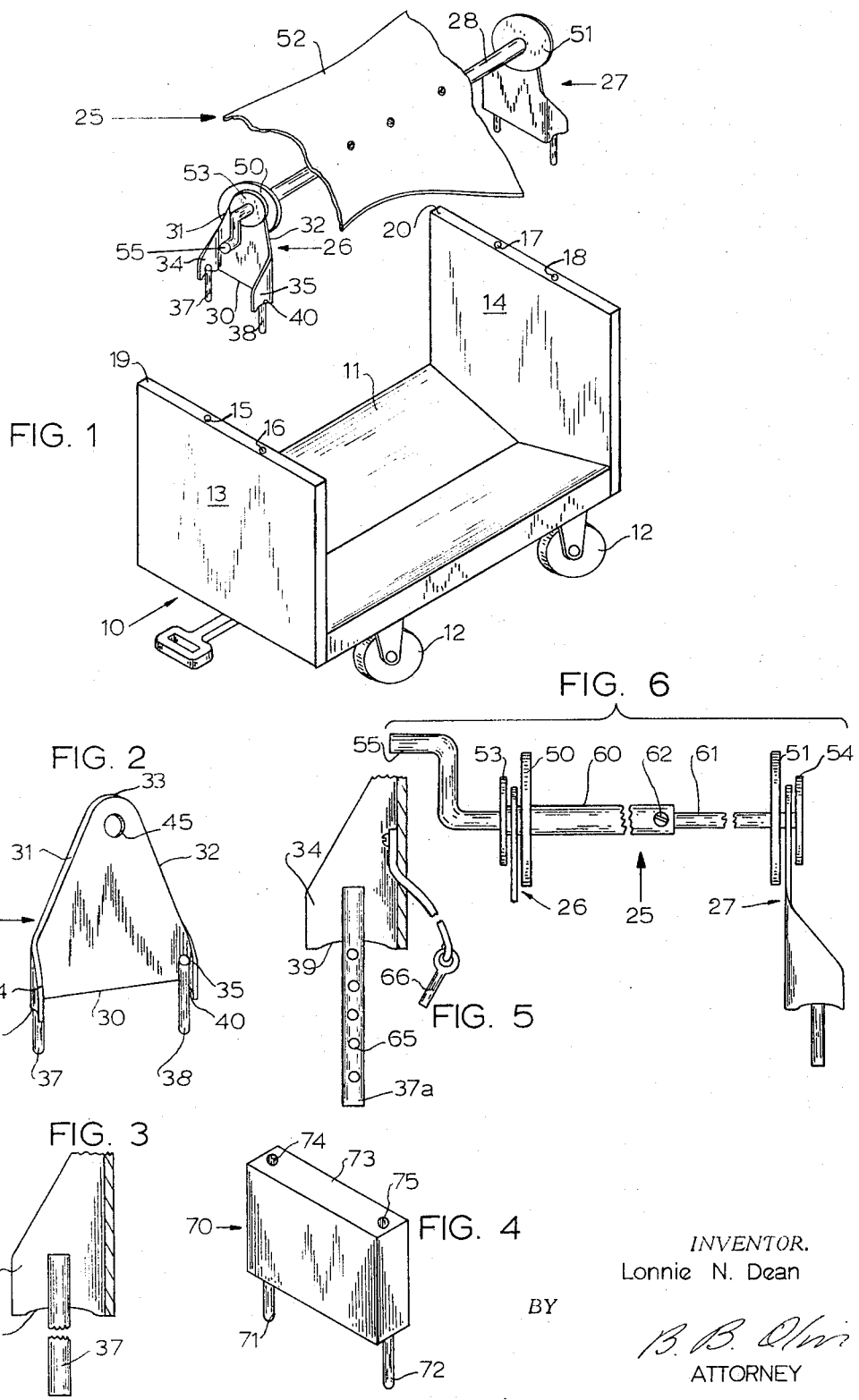
INVENTOR.
Lonnie N. Dean
BY
*B. B. Olin*
ATTORNEY

United States Patent Office
3,383,133
Patented May 14, 1968

3,383,133
TARPAULIN ROLLER FOR AIRCRAFT
LUGGAGE CARRIER
Lonnie N. Dean, Rte. 1, Box 317-C,
Durham, N.C. 27705
Filed June 21, 1966, Ser. No. 559,262
7 Claims. (Cl. 296—98)

ABSTRACT OF THE DISCLOSURE

A tarpaulin reel apparatus is designed to be removably mounted on an aircraft luggage carrier and provides means for winding, unwinding and storing a tarpaulin cover.

This invention relates to a tarpaulin mounting structure and, more particularly, to a tarpaulin reel apparatus which is to be mounted on an aircraft luggage carrier for winding, unwinding and storing a tarpaulin cover.

For many years, luggage and cargo have been carried from an incoming airplane to the terminal by means of trailer-like aircraft luggage carriers which are pulled by a field tractor. As is often the case, the luggage or cargo would be damaged en route during inclement weather were it not for the tarpaulins or the like which are spread over the articles. It is commonly the practice to drape a tarpaulin cover over the area as defined by the aircraft luggage carrier after unfolding it from its stored position on the outside of a selected retaining wall. After the tarpaulin cover has been used, it may be refolded and tied on the retaining wall. During periods of dry weather, the tarpaulin covers are only periodically inspected to see if they are securely fastened on the retaining wall; thus, quite often, the tarpaulin cover is torn when it breaks free of the restraining devices and drapes onto the runway surface where it becomes entangled in the wheels of an adjacent aircraft luggage carrier. It has been observed that most tarpaulin covers now in use are damaged beyond repair most frequently in the manner described and very seldom is a tarpaulin cover replaced due to the natural deterioration of the same.

Therefore, an object of this invention is to provide an aircraft luggage carrier with a removable reel device which is adapted to mount a tarpaulin for covering luggage and cargo carried by the aircraft luggage carrier.

Another object of this invention is to provide a reel for an aircraft luggage carrier which is adapted to serve as a storage rack for a tarpaulin cover while the same is not in use.

A further object of this invention is to provide a reel for mounting a tarpaulin cover which is adjustable in the vertical and horizontal directions so as to be adapted to be mounted on an aircraft luggage carrier of almost any length and to extend above the luggage or the like which resides in the luggage carrier.

A still further object of this invention is to provide an aircraft luggage carrier with a tarpaulin reel which is adaptable to be removed and stored and which prevents damage from occurring to the tarpaulin during storage.

Other objects and advantages of the present invention will become apparent and immediately suggest themselves to those skilled in the art to which the invention is directed from a reading of the following specification in connection with the accompanying drawings in which:

FIGURE 1 is an exploded pictorial view of the tarpaulin reel showing the same as it would be mounted on an aircraft luggage carrier and connected to a tarpaulin;

FIGURE 2 is a pictorial view showing an end support plate as employed by this apparatus;

FIGURE 3 is a fragmentary view of one end of a support plate showing a flanged edge, the stake means for mounting the plate and the geometric arrangement of the flange which adapts the support plate to be mounted on either a rectangular or a rounded upper extending edge of the aircraft luggage carrier;

FIGURE 4 is a pictorial view of a height adjustable insert;

FIGURE 5 is a fragmentary view of an alternative embodiment for adjusting the height of the tarpaulin reel relative the aircraft luggage carrier; and FIGURE 6 is an elevation view of an alternative embodiment showing telescoping members which adapt the tarpaulin reel to be extended to accommodate any length of aircraft luggage carrier.

In combination with an aircraft luggage carrier, this invention contemplates the use of a tarpaulin reel which is adapted to wind and unwind the tarpaulin cover for the aircraft luggage carrier and which is removably mounted thereon. The tarpaulin reel includes a pair of end support plates which are shaped substantially like an isosceles triangle. The equal and upwardly extending sides of the support plates are curved outwardly so as to provide bases for the same which are adapted to seat on the upper extending edges of the retaining walls of the luggage carrier which may be either a flat or a curved surface. The base is also provided with downwardly extending stakes which are adapted to be received by openings located in the top portion of the luggage carrier retaining walls. The stakes in combination with the base are adapted to securely seat the tarpaulin reel on the aircraft luggage carrier and to prevent any excessive lateral movement thereon. The windlass portion of the tarpaulin reel includes a shaft which is mounted in the upper portions of the support plates and which securely receives a pair of discs. The discs are positioned adjacent respective support plates and on the inwardly facing surface thereof and are adapted to align the tarpaulin when being rolled on the shaft. The shaft is provided with a second pair of discs which are securely mounted thereon adjacent the outwardly facing surfaces of the support plates. It can be seen that the two pairs of discs effectively flank the side surfaces of the support plates and prevent the shaft from sliding longitudinally therein. One exposed end of the shaft is provided with a conventional handle which is manually operable to rotate the shaft in the support plates.

The tarpaulin reel may be adjustable in the longitudinal direction by providing the same with a telescoping shaft which includes a tubular member, a rod member which is slidably mounted therein, and means to secure the rod member relative the tubular member. Two embodiments are disclosed for adjusting the vertical height of the tarpaulin reel. In the first embodiment, the stakes are to be lengthened and are to be provided with holes which are located perpendicular to the axis thereof. The holes are adapted to receive a pin or the like; therefore, the height of the tarpaulin reel may be adjusted relative the aircraft luggage carrier by the positioning of the pin in selected holes. The second embodiment for vertically adjusting the height of the tarpaulin reel includes a substantially rectangular box of a thickness approximately equal to the thickness of the base surface of the support plate. The rectangular box is provided with a pair of apertures located on the outwardly facing surface thereof which are adapted to receive the stakes which extend downwardly from the base of a selected support plate. On a surface, which is parallel to and oppositely positioned from the top surface, a plurality of downwardly extending rods, which are in substantial alignment with the stakes of the support plates, are adapted to extend into the openings located in the top portions of the aircraft luggage carrier retaining walls. It can be seen that the height of the rectangular box defines the vertical distance through which the tarpaulin reel may be raised.

The elements of this invention are illustrated in connection with the accompanying drawings in which the figures are illustrative of the preferred embodiment of the invention.

The apparatus of this invention is contemplated to be used in combination with an aircraft luggage carrier 10 having a bottom wall 11 which is supported for movement by wheels 12. Bottom surface 11 is substantially rectangular in plan and is slightly V-shaped in cross section so that the luggage which may be placed thereon has a tendency to slide inwardly toward the middle thereof. Bottom wall 11 is bounded on its short parallel ends by retaining walls 13 and 14 which extend upwardly therefrom. Retaining walls 13 and 14 are provided with openings 15 and 16, and 17 and 18, respectively, which extend vertically downwardly in the top surfaces 19 and 20 of the respective retaining walls. The top surfaces 19 and 20 of retaining walls 13 and 14 may be substantially flat as shown or may be rounded (not shown).

The tarpaulin reel is generally designated by the reference numeral 25 and includes support plates 26 and 27 and a shaft 28 which is rotatably mounted in support plates 26 and 27. Support plates 26 and 27 are substantially identical; therefore, only support plate 26 will be described in detail. Support plate 26 has the appearance of an isosceles triangle in elevation and is peripherally defined by base 30 and two equal and converging sides 31 and 32. Equal sides 31 and 32 which meet at an apex 33 extend downwardly therefrom and curve outwardly so as to provide base 30 with flanges 34 and 35. Flanges 34 and 35 adapt base 30 to seat on either upper surface 19 or 20 of retaining wall 13 or 14. Support plate 26 is provided with two elongated stakes 37 and 38 which are respectively mounted on flange portions 34 and 35 and form continuations thereof. Stakes 37 and 38 may be mounted thereon by any convenient means such as welding or the like and are adapted to reside in openings 15 and 16 of retaining wall 13 or, alternatively, in openings 18 and 17 of retaining wall 14. Flanges 34 and 35 may also be provided with concave recesses 39 and 40 which adapt support plate 26 to be mounted on either a flat or a curved surface.

Support plate 26 is further provided with a hole 45 which is located in apex 33. Hole 45 is adapted to rotatably receive shaft 28 which is to extend between and in effect join support plates 26 and 27. Shaft 28 is provided with a pair of rigidly mounted discs 50 and 51 which are adapted to reside against the inwardly facing portions of support plates 26 and 27 and in combination with shaft 28 form a spool about which a tarpaulin 52 may be wound. Discs 50 and 51 are adapted to align tarpaulin 52 on shaft 28 and prevent the same from becoming entangled in the joint formed by shaft 28 and support plates 26 and 27. Shaft 28 is also provided with bearing discs 53 and 54 which are rigidly mounted thereon and are externally positioned with respect to support plates 26 and 27 a selected distance outwardly from discs 50 and 51, so that the bottom portions of windlass support plates 26 and 27 are adapted to move horizontally in the direction of shaft 28 a small distance to compensate for slight variations in distances between retaining walls 13 and 14 which may result from discrepancies in manufacture or damage to the same during the use thereof. One exposed end of shaft 28 is provided with a conventional handle 55 which is integrally secured thereto and which is adapted to rotate shaft 28.

In reference to FIGURE 6, shaft 28 may be made telescoping by providing the same with a shaft cylinder 60 which is rotatably mounted in support plate 26 and which rigidly receives discs 50 and 53. Shaft cylinder 60 slidably receives a telescoping rod 61 which is rotatably mounted in support plate 27 and rigidly receives discs 54 and 51. Shaft cylinder 60 is provided with a set screw 62 which extends therethrough and engages telescoping rod 61 whereby piston shaft 61 may be adjustably positioned in shaft cylinder 60 thus adapting tarpaulin reel 25 to be mounted on any length aircraft luggage carrier.

The height of tarpaulin reel 25 may be adjusted by lengthening stakes 37 and 38 which are designated in FIGURE 5 by 37a and 38a (38a not shown). Stakes 37a and 38a are provided with a plurality of holes 65 which are adapted to receive a pin 66 or the like whereby tarpaulin reel 25 may be adjustably mounted with respect to aircraft luggage carrier 10 by inserting pin 66 in the proper hole 65 and lowering stakes 37a and 38a into selected openings such as 15 and 16 in retaining wall 13 whereupon pins 66 reside on upper surface 19. A more permanent type of height adjusting means is shown in FIGURE 4 and includes a substantially rectangular box 70 having downwardly extending rods 71 and 72. The upwardly facing surface 73 of box 70 is provided with apertures 74 and 75 which are adapted to receive stakes 37 and 38. It can be seen that the height of tarpaulin reel 25 may be adjusted by placing rods 71 and 72 in openings 15 and 16 of retaining wall 13 and mounting support plate 26 thereon by inserting stakes 37 and 38 respectively into apertures 74 and 75.

It is to be noted that support plates 26 and 27 have their vertical surfaces extending upwardly from retaining walls 13 and 14 so that the edges of the same are flush with and form substantial continuations of the inside surfaces of retaining walls 13 and 14. Such an arrangement allows the aircraft luggage carrier to be loaded up to the level of shaft 28 without encountering foreign obstructions. Furthermore, the openings in support plates 26 and 27 including hole 45 which receive shaft 28 may be in the form of slotted U's which extend upwardly to the tops thereof and adapt support plates 26 and 27 to openly receive shaft 28. Thus, support plates 26 and 27 may be rigidly secured to retaining walls 13 and 14 and shaft 28 which mounts tarpaulin 52 may be stored by lifting the same from the slotted U's.

In operation, tarpaulin reel 25 is placed on aircraft luggage carrier 10 by inserting stakes 37 and 38 of support plate 26 and the corresponding stakes of support plate 27 respectively into openings 15 and 16 of retaining wall 13 and 17 and 18 of retaining wall 14. Tarpaulin 52 is then connected to shaft 28 by any convenient means such as metal screws or the like and is wound thereon by rotating shaft 28 by means of handle 55. When tarpaulin 52 is to be used to cover luggage residing in aircraft luggage carrier 10, it is manually pulled outwardly from tarpaulin reel 25 thus causing shaft 28 to rotate in the reverse direction.

Many different embodiments of this invention may be made without departing from the scope and spirit thereof. Therefore, it is to be understood that the invention is not to be limited to the specific embodiment shown and described herein except as defined in the appended claims.

I claim:

1. In combination with an aircraft luggage carrier having a bottom wall mounted on ground engaging wheels and vertically positioned opposed and parallel retaining walls integrally extending upwardly from said bottom wall and defining a cargo space, an apparatus comprising:
    (a) a pair of opposed vertical support plates adapted to centrally reside on the upper exposed surfaces of said retaining walls adjacent said cargo space, said support plates having integral and outwardly curving flanges adapted to mount said support plates on said retaining walls and means for detachably connecting the same to said retaining walls;
    (b) windlass means rotatably support by said support plates and including:
        (1) shaft means journaled in said support plate and suspended thereby;
        (2) aligning means including a disc rigidly mounted on each end of said shaft means between said support plates and adjacent to the same;
        (3) bearing means including a disc rigidly secured on each end of said shaft means and positioned externally thereon with respect to and adjacent said support plates and cooperating with said aligning discs to flank said support plates and define the movement of said shaft means relative said support plates in its axial direction; and (4) a handle integrally extending from one end of said shaft means for reversibly rotating the same; and (c) a tarpaulin cover fastened to said shaft means and adapted to be unwound so as to cover articles of luggage during inclement weather and to be rewound between said aligning means for storage in favorable weather.

2. The apparatus of claim 1 wherein said flanges have concave recesses in the bottom portions thereof which adapt said support plates for mounting on either a flat or curved surface.

3. The apparatus of claim 1 wherein said means for detachably connecting said support plates to said retaining walls consists of a pair of stakes integrally connected to and extending downwardly from said flanges and said retaining walls defining a plurality of openings adapted to receive said stakes and vertically position said support plates whereby said support plates may be selectively removed therefrom.

4. The apparatus of claim 3 wherein said shaft means is elongatable and includes a shaft cylinder rotatably mounted in a selected support plate, a telescoping rod rotatably mounted in the other support plate and being slidably received by said shaft cylinder, and means mounted in said shaft cylinder for selectively locking said telescoping rod relative said shaft cylinder whereby said shaft cylinder and said telescoping rod rotate in unison.

5. The apparatus as claimed in claim 4 wherein said support plates are provided with means for adjusting the height thereof relative said retaining walls.

6. The apparatus of claim 5 wherein said height adjusting means consists of a pair of rectangular shaped blocks, said blocks adapted to support said support plates and having a pair of apertures in the top thereof, said apertures adapted to slidably receive said stakes, said blocks each having a pair of downwardly extending rods made integral with the base thereof, said rods being adapted to be received by said openings in said retaining walls.

7. The apparatus of claim 5 wherein said height adjusting means includes said stakes extending downwardly from said support plates, said stakes being substantially elongated and having radially arranged holes extending therethrough with each of said holes of a given stake being horizontally aligned with a selected hole of every other stake and pin means adapted to be removably mounted in said selected holes and to engage said retaining walls when said stakes are received by said openings in said retaining walls to support said support plates a given distance above said retaining walls.

References Cited

UNITED STATES PATENTS

| | | | |
|---|---|---|---|
| D. 157,442 | 2/1950 | Schwartzman et al. | 296—28.2 X |
| 1,784,248 | 12/1930 | Nolen et al. | 296—98 |
| 1,786,048 | 12/1930 | Williams | 296—98 |
| 2,061,673 | 11/1936 | Robinson | 296—3 X |
| 2,833,550 | 5/1958 | Frick | 280—47.34 |
| 3,118,684 | 1/1964 | Kappen | 280—47.34 X |

FOREIGN PATENTS

| | | |
|---|---|---|
| 813,095 | 9/1951 | Germany. |
| 570,653 | 12/1957 | Italy. |

RICHARD J. JOHNSON, *Primary Examiner.*

BENJAMIN HERSH, *Examiner.*

C. C. PARSONS, *Assistant Examiner.*